United States Patent [19]

Tsai

[11] Patent Number: 4,809,406
[45] Date of Patent: Mar. 7, 1989

[54] EYE GLASSES FASTENING DEVICE WITH A CLIP-LIKE MEMBER

[76] Inventor: Sen-Yao Tsai, 2F. No. 1, Lane 222, Tun Hua N. Road, Taipei, Taiwan

[21] Appl. No.: 116,328

[22] Filed: Nov. 3, 1987

[51] Int. Cl.$^4$ .............................................. A44B 21/00
[52] U.S. Cl. ........................................ 24/3 C; 24/3 J; 24/338; 24/509; 248/229; 248/DIG. 2
[58] Field of Search ............... 24/3 C, 3 R, 3 A, 3 G, 24/3 H, 3 J, 3 L, 326, 327, 329, 331, 332, 335, 336, 338; 248/DIG. 2, 229, 231.8; 224/252, 269

[56] References Cited

U.S. PATENT DOCUMENTS

| | | | |
|---|---|---|---|
| 1,401,770 | 12/1921 | Golden | 248/229 |
| 2,537,703 | 1/1951 | Randa | 24/332 X |
| 2,850,152 | 9/1958 | Marrufo | 224/252 X |
| 4,557,451 | 12/1985 | Conway | 248/DIG. 2 |

Primary Examiner—Francis K. Zugel
Assistant Examiner—James R. Brittain
Attorney, Agent, or Firm—Browdy & Neimark

[57] ABSTRACT

An eyeglass fastening device for safely securing eyeglasses to the clothes or other article of the wearer when the eyeglasses are not being used, thereby facilitating the carrying of the eyeglasses in a ready and safe manner, so as to prevent the eyeglasses from dropping or being lost in the even of jumping, running and exercising, wherein a clip-like member is attached to one end of a fastening belt for ready attachment to the clothes of the wearer, and a buckle unit is disposed at the opposite end of the fastening belt so that the eyeglasses can be engaged or disengaged from the fastening belt with ease.

3 Claims, 4 Drawing Sheets

EYE GLASSES FASTENING DEVICE WITH A CLIP-LIKE MEMBER

BACKGROUND OF THE INVENTION

The present invention relates to an eyeglass fastening means which has a flexible belt having a buckle member attached at one end thereof and a large clip-like fastening member fixed at the other end so that the eyeglasses can be grasped by the flexible belt when the buckle member is engaged; and the glasses being held by the belt as well as the flexible belt itself can be tightly secured, by means of the clip-like means, to the clothes or other article of the wearer so that the eyeglasses can be carried around by the wearer, when removed, and be protected from dropping to the ground in the event of running or jumping.

It very often happens to people wearing glasses that the glasses are easily lost or dropped when taken off and put in their pockets, especially in the event of exercising. Moreover, the glasses when removed and placed on a table are easily swept off from the table as a result of carelessness and broken into pieces; and glasses put into a pocket are easily broken when the person sits or lies down.

The loss or breaking of the glasses can cause great inconvenience, especially to those people highly dependent on their use. To prevent or protect their glasses when they are not using them from being broken or lost is a major concern of eyeglass users.

SUMMARY OF THE INVENTION

The primary object of the present invention is to provide a readily operable and practical eyeglass fastening means which uses a flexible belt facilitating the holding of eyeglasses of different sizes, and a clip-like fastening member attached at one end thereof so that the held eyeglasses can be readily secured to the clothes, pocket, or some article worn by a person for the purpose of protecting said eyeglasses from dropping to the ground or being lost in the event of running, jumping or other exercising.

One further object of the present invention is to provide a readily operable eyeglass fastening means wherein a piece of self adhesive unit is attached to one side of the clip-like fastening member, opposite to the side on which one end of the flexible belt is attached, so that the eyeglasses held by the flexible belt can also be removably attached to the surface of a table, window, and other such place.

BRIEF DESCRIPTION OF THE DRAWINGS

To better explain the structure and operation mode of the present invention, a number of drawings are provided along with a detailed description of the preferred embodiment, of which.

DETAILED DESCRIPTION OF THE PREFERRED EMBODIMENT

Figure 1:
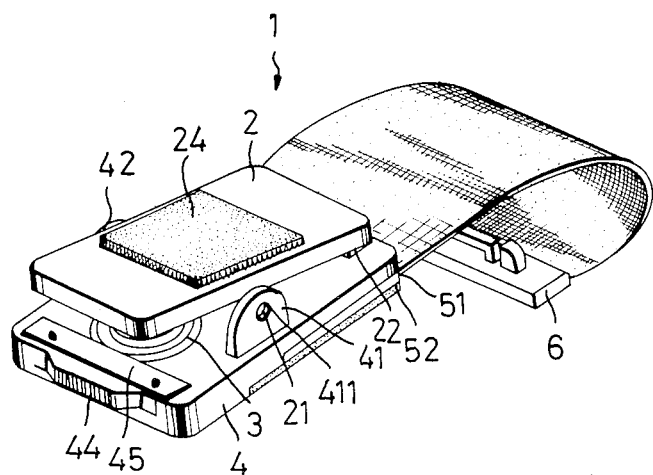
FIG. 1 is a perspective view of the present invention.
Figure 3:
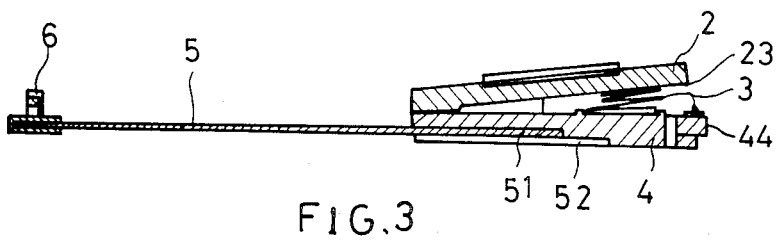
FIG. 3 is an elevational sectioned view of the present invention.
Figure 2:
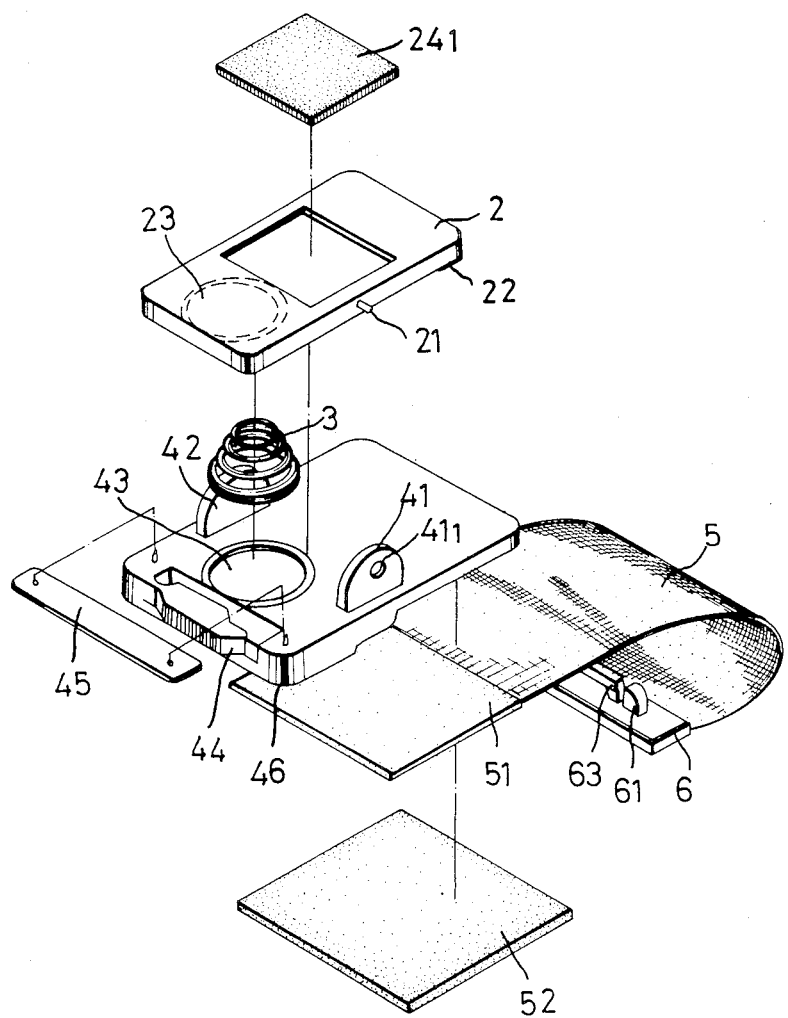
FIG. 2 is an exploded perspective view of the components of the present invention.

Referring to FIG. 1 and FIG. 2, the present invention mainly comprises two portions; one is a flexible belt 5 and the other is a clip-like member including an upper plate 2 and a lower plate 4 with a spring 3 disposed therebetween for resiliently operating the clip-like member.

Upper plate 2 is structured in a rectangular form, with a pair of short extensions 21 projecting from the middle of both the sides thereof, and a piece of beveled member 22 having a right triangular cross section disposed on the front underside of upper plate 2, at the tip thereof, with a plurality of parallel fine lines disposed thereon, which work in cooperation with a plurality of similar parallel fine lines disposed on the front tip of lower plate 4 for firmly fixing the clip-like member to the clothes or other article of the wearer. Near the other end of upper plate 2, opposite to the end with beveled member 22, is disposed a circular recess 23 for receiving one end of a spiral spring 3 in assembly, which is adopted to force the front tips of the upper and lower plates 2, 4 into tight abutment with each other.

Lower plate 4 is formed in the same shape as upper plate 2, but has larger dimensions. The bottom side of lower plate 4 is structured in a step-like manner. A pair of upright lugs 41, 42, both having an arcuate top edge, are located near the middle of the two opposite edges of lower plate 4, on the side facing the underside of upper plate 2, with upper plate 2 located therebetween lugs 41, 42 and the two short extensions 21 in engagement with a bore in each of the two upright lugs 41, 42 respectively. A circular recess 43 is defined on one side of lower plate 4 and located between the two lugs 41, 42, opposite circular recess 23, for receiving the base of spiral spring 3.

At the foremost edge of lower plate 4, there is disposed an elongated slot, and a button lever 44, having a free end, integrally attached on one side of the elongated slot, and a rectangular plate 45 located on top of the elongated slot to confine the movement of button lever 44 in a desired direction for precise operation of button lever 44. Plate 45 has a pair of symmetrically placed bores located on each end thereof which are engaged with a protrusion on each end of the elongated slot respectively.

A flexible belt 5 is attached to the underside of lower plate 4, with a soft pad 52 placed on one end of belt 5, and a buckle unit 6 mounted on the other end thereof. Buckle unit 6 is comprised of two symmetrically located upright lugs 61, spaced apart by an elongated upright therebetween; a rectangular bracket-like element 63 having an opening therein facing downward and an outward extended flange disposed along a horizontal edge of bracket-like element 63. Thus buckle unit 6 is releasably associated with button lever 44 when buckle unit 6 is fitted into the elongated slot next to button lever 44.

Figure 4:
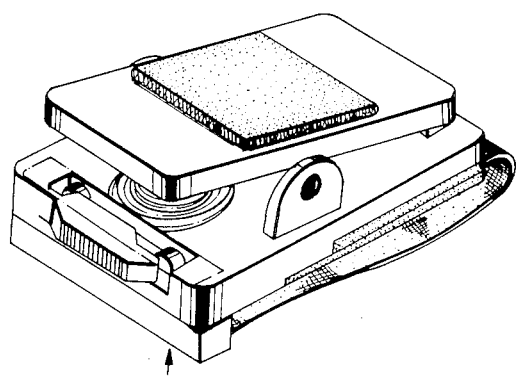
FIG. 4 is a diagram showing the end of the flexible belt buckled to the front tip of the clip-like member in an operative closed position.
Figure 5:
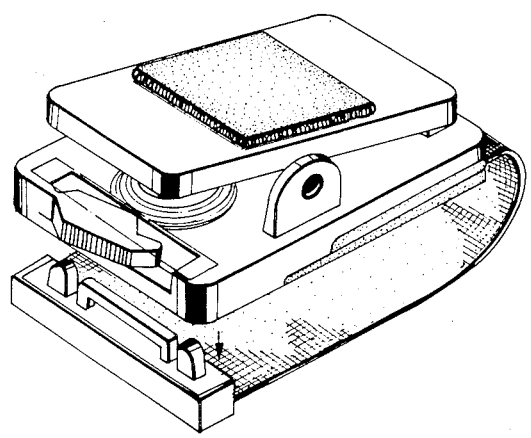
FIG. 5 is a diagram partially showing the structure of the buckle member when it is in non-operative open position.
Figure 6:
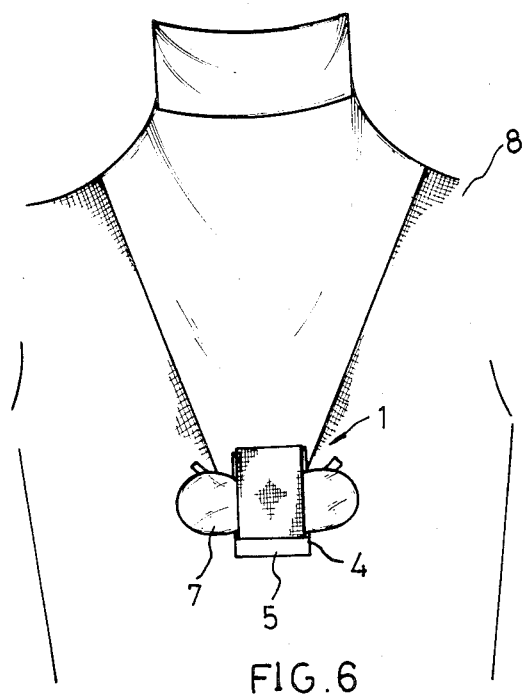
FIG. 6 is a diagram showing one of the practical applications of the present invention.
Figure 7:
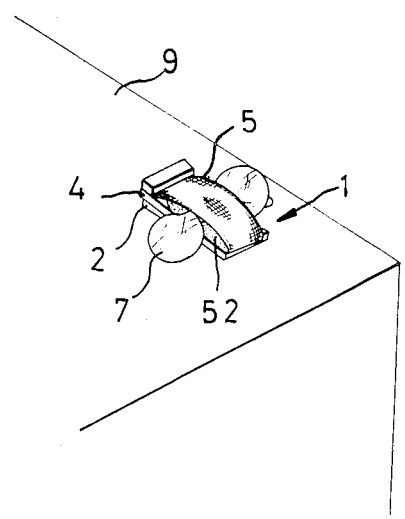
FIG. 7 is a diagram showing another application of the present invention.

As shown in FIG. 4 and FIG. 5, in operation, one end of flexible belt 5 with buckle unit 6 is positioned to insert into the elongated slot, and the flanged edge of bracket-like element 63 becomes engaged with the opposite side upon which pressure is applied on thumb-actuated button lever 44, free to be pressed inward owing to its free-end structure. A pair of eyeglasses can be placed in association with flexible belt 5 and then buckle unit 6 is brought into engagement with button lever 44. Thus the eyeglasses can be held by belt 5. To remove the eyeglasses from flexible belt 5, one has only to press button lever 44 inward so as to cause an inward movement of button lever 44 against the flanged edge of said bracket-like element 63, thus readily effecting the disengagement of buckle unit 6 from the elongated slot, and thus, the eyeglasses can be disengaged from belt 5 with ease.

It will be obvious to those skilled in the art that various changes may be made without departing from the scope of the invention and the invention is not to be considered limited to what is shown in the drawings and described in the specification.

I claim:

1. An eyeglass fastening means for use in attaching a pair of eyeglasses to the clothes or other article, the fastening means comprising
   a clip-like fastening means including
      an upper plate,
      a lower plate pivotably joined to said upper plate,
      a conical spring located between said upper and lower plates near a first end of said plates so as to provide a gripping effect at an opposite second end thereof;
   a flexible belt means and a buckle means;
   said upper plate having a rectangular configuration;
   a pair of short extensions projecting from both sides of said upper plate off-center of said upper plate between said first and second ends;
   a circular recess provided on an underside of said upper plate, near a said first end thereof;
   an oblong beveled grip member having a right triangular cross-section, being attached at said second end of said upper plate;
   said lower plate structured in a rectangular form with its underside having a step-like surface;
   said lower plate including
      an elongated slot laterally disposed at said first end thereof,
      a button lever located along a top side of said elongated slot and having a free end,
      an oblong restraint plate on top of said elongated slot, closing one side of said oblong slot;
   a pair of symetrically located upright lugs having a through bore in their top ends extending on each side from said lower plate in a corresponding position with respect to said paired short extensions on each side of said upper plate which upper plate is fitted between said two upright lugs during assembly;
   a circular recess in said lower plate provided near an edge of said elongated slot for receiving a bottom of said conical spring;
   a piece of simulated leather type material glued on one step of said step-like surface on the underside of said lower plate so that one end of said flexible belt is able to be stitched thereto, and a pad of soft material glued on another side of said simulated leather type material;
   and said buckle means attached at a free end of said belt.

2. An eyeglass fastening means according to claim 1 wherein
   said buckle means comprises
      an oblong plate,
      a pair of spaced upright lugs disposed on one side of said oblong plate,
      a rectangular bracket-like element fixedly mounted between said pair of spaced upright lugs and having an opening facing toward a surface of said oblong plate,
      and a flange portion provided along one edge of said bracket-like element for easy detachment of said buckle means from said elongated slot on the press of said button lever.

3. An eyeglass fastening means according to claim 1 wherein
   said restraint plate is disposed on top of said button lever, closing one side of said elongated slot and limiting said button lever to move properly when pressed,
   a pair of bore means with a bore near each end of said restraint plate,
   and two upright projections located on an upper surface of said lower plate positioned to extend into said bores of said resilient plate to fix said restraint plate to said lower plate.

* * * * *